Dec. 13, 1966    C. C. BRESTEL ET AL    3,290,977
DIE CUTTING MACHINES FOR LABELS AND THE LIKE
Filed Sept. 1, 1965    7 Sheets-Sheet 1

INVENTORS
CLARENCE C. BRESTEL AND
HOWARD R. MASCHINOT,

BY Yungblut, Melville, Strasser and Foster
ATTORNEYS

Dec. 13, 1966     C. C. BRESTEL ET AL     3,290,977
DIE CUTTING MACHINES FOR LABELS AND THE LIKE
Filed Sept. 1, 1965     7 Sheets-Sheet 2

INVENTORS
CLARENCE C. BRESTEL AND
HOWARD R. MASCHINOT,

BY Yungblut, Melville, Strasser and Foster
ATTORNEYS

Dec. 13, 1966 C. C. BRESTEL ET AL 3,290,977
DIE CUTTING MACHINES FOR LABELS AND THE LIKE
Filed Sept. 1, 1965 7 Sheets-Sheet 4

INVENTORS
CLARENCE C. BRESTEL AND
HOWARD R. MASCHINOT,
BY Yungblut, Melville, Strasser and Foster
ATTORNEYS Dec. 13, 1966 C. C. BRESTEL ET AL 3,290,977
DIE CUTTING MACHINES FOR LABELS AND THE LIKE
Filed Sept. 1, 1965 7 Sheets-Sheet 6

INVENTORS
CLARENCE C. BRESTEL AND
HOWARD R. MASCHINOT,

BY Yungblut, Melville, Strasser and Foster
ATTORNEYS

Dec. 13, 1966  C. C. BRESTEL ET AL  3,290,977
DIE CUTTING MACHINES FOR LABELS AND THE LIKE
Filed Sept. 1, 1965  7 Sheets-Sheet 7

INVENTOR
CLARENCE C. BRESTEL AND
HOWARD R. MASCHINOT,
BY Yungblut, Melville, Strasser and Foster
ATTORNEYS

United States Patent Office 3,290,977
Patented Dec. 13, 1966

3,290,977
DIE CUTTING MACHINES FOR LABELS
AND THE LIKE
Clarence C. Brestel, Hamilton County, Ohio, and
Howard R. Maschinot, Erlanger, Ky., assignors to The
Printing Machinery Company, Cincinnati, Ohio, a
corporation of Ohio
Filed Sept. 1, 1965, Ser. No. 484,385
10 Claims. (Cl. 83—467)

Machines for die cutting labels or other printed papers into special shapes have hitherto been devised. The labels or other articles are printed on suitable sheets of paper, a stack is formed from the printed sheets and, since the labels are usually of a size substantially smaller than the sheets of paper upon which they are printed, a stack of printed sheets is cut apart into rectangular stacks of printed labels by a careful shearing operation. The individual papers in the sheared stacks normally contain one printed label representation each. The labels to which the invention is addressed then require die cutting, because they are of irregular or special shapes which are non-rectangular in configuration.

Certain machines for accomplishing die cutting have a platform or anvil which is driven upwardly through an opening in a table. Above the table there is a head upon which is mounted a die configured to cut the labels into the shapes desired. A sheared stack of labels is moved over the table into a position appropriate for the die cutting operation, and the anvil or platform is operated to move the sheared stack upwardly against the cutting edges of the die mounted on the head. The die is a hollow element shaped in accordance with the desired configuration of the labels. It has cutting edges at its lower end. The die cuts the labels as the sheared stack is moved upwardly against it. The die-cut labels normally pass through the hollow interior of the die and are removed above the head.

It will be understood that the die element has to be carefully located in the machine with reference to the platform or anvil. Adjustable die mounting means are provided for this purpose and do not form a part of the present invention. However, it is equally important that the sheared stacks of printed labels shall be located accurately with reference both to the anvil and to the die itself. The basic object of this invention relates to improved means for locating the sheared stacks of printed labels in the machine and for holding them in located position at least until each stack has been accurately engaged by the anvil on the bottom and the die on the top.

Another object of the invention has to do with the provision of locating means having a positive locating action on a sheared stack of printed labels or the like, in two directions at an angle to each other.

Yet another object of the invention relates to the provision of improved pushing means which engage and locate the sheared stack of printed labels against a guide or stop means which is stationary at the time of the location of the printed and sheared stack and with the timing and release of the pushing means, all as will be explained hereinafter.

These and other objects of the invention which will be set forth later or will be apparent to one skilled in the art upon reading this specification, are accomplished by that construction and arrangement of parts of which an exemplary embodiment will now be described. Reference is made to the accompanying drawings wherein.

Figure 2:
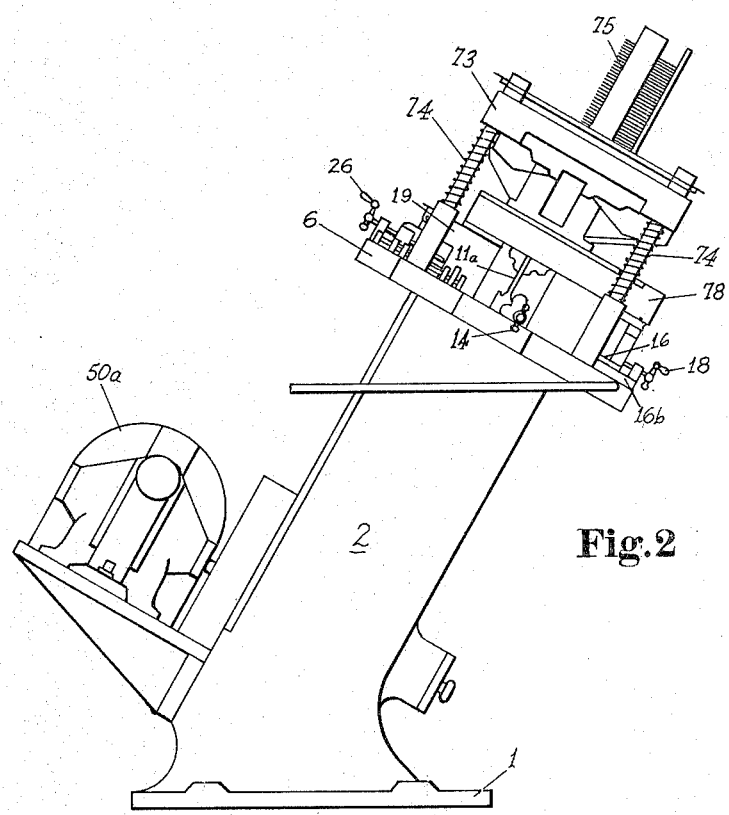
FIGURE 2 is a side elevational view of a label cutting machine.

It will be understood by those familiar with die cutting machines of the type herein set forth that they comprise a machine base as shown at 1 in FIGURES 2 and 5 through 7, and an upstanding machine column 2 at an angle to the base. The machine comprises an anvil or platform member 4 attached to a plunger 5 mounted for reciprocation in the column 2 of the machine. The machine also has a table 6 which, since it is located in a position normal to the line of reciprocation of the plunger 5 will be tilted at an angle to the horizontal as shown in FIGURE 2, although in the other figures of this case the table and the various elements upon it are illustrated in such a way that they appear horizontal. The tilted position of the table and the anvil assists in the positioning of the stacks of labels against the stops and pusher means.

Figure 1:
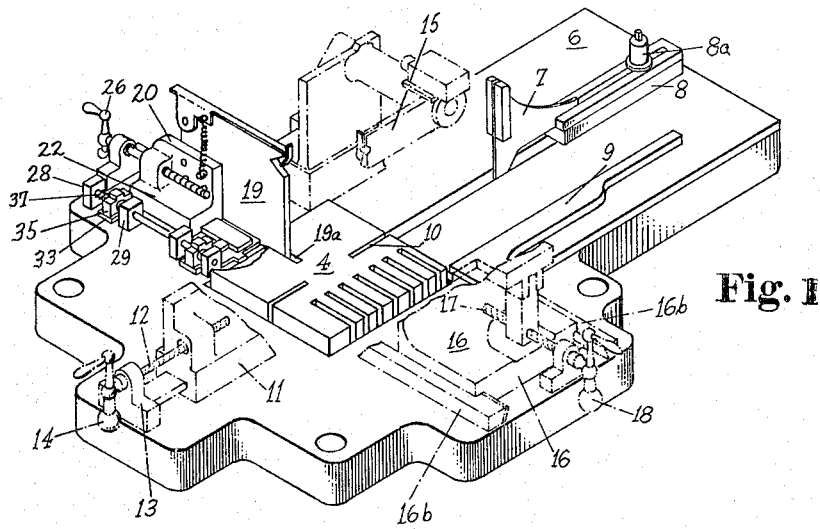
FIGURE 1 is a perspective view of the table portion of the machine including the top of the anvil, together with certain locating means for the sheared stack.
Figures 9, 10:
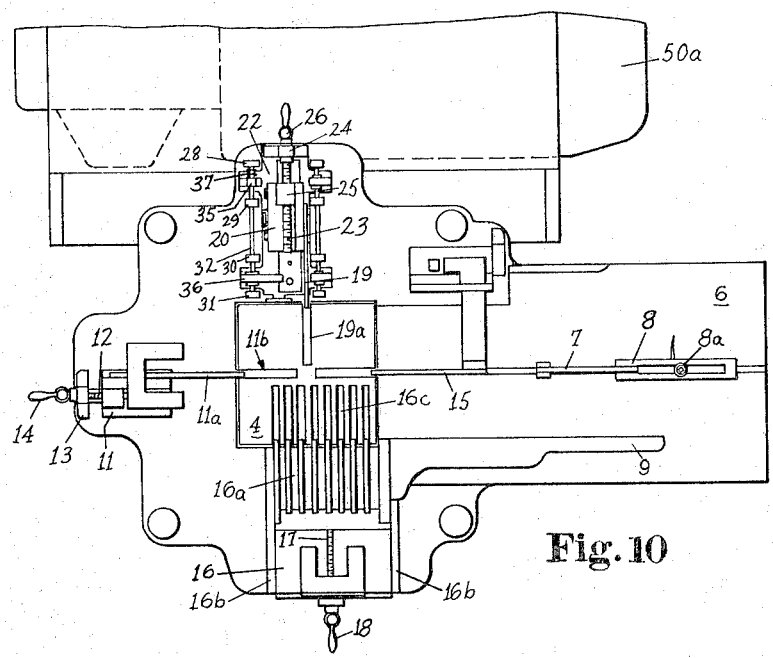
FIGURE 9 is a perspective view of the table and certain guide and pusher means thereon.
FIGURE 10 is a plan view of the table with parts cut away, showing the anvil and the first pusher element in retracted position.
Figure 12:
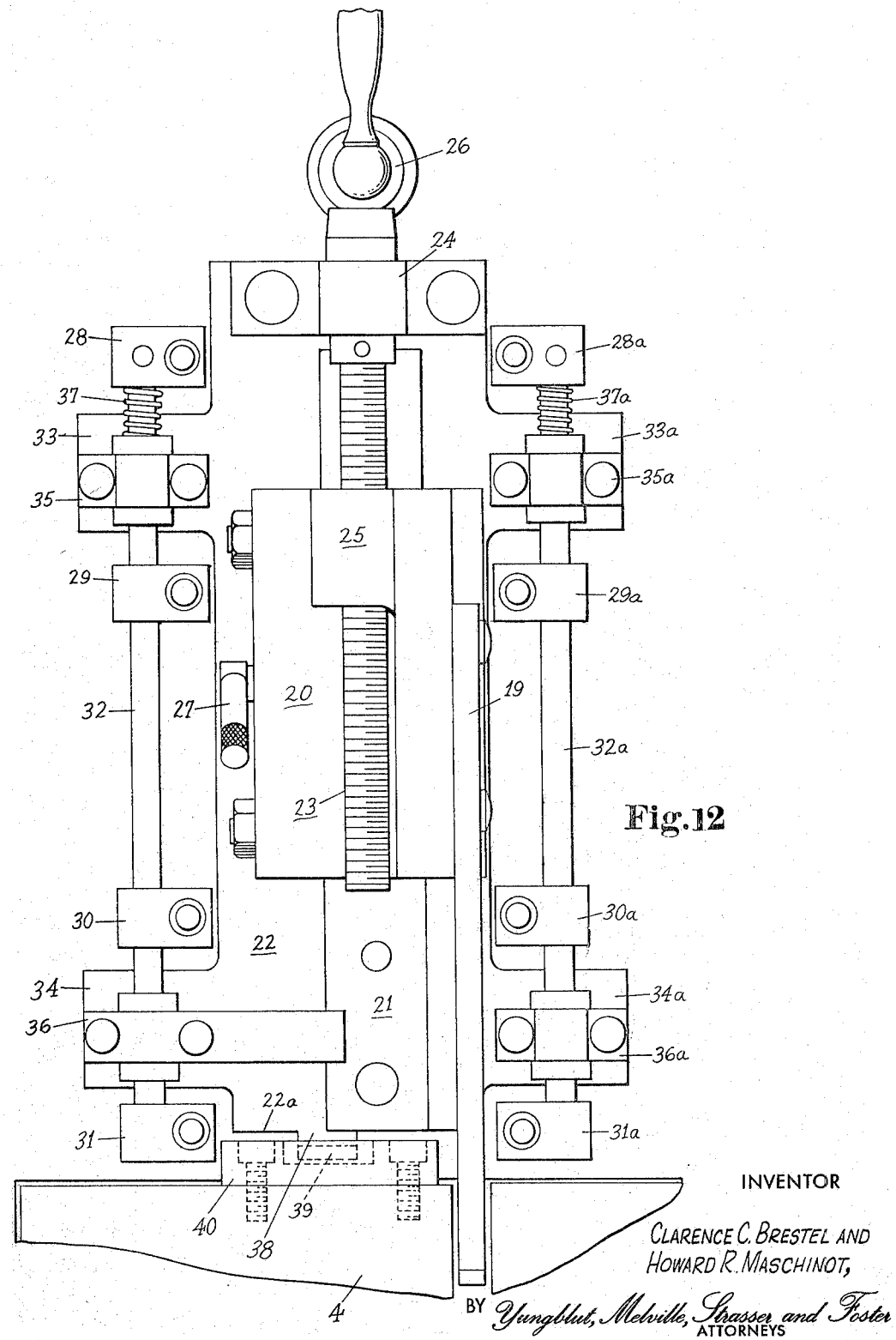
FIGURE 12 is a plan view of the second pusher element and its supporting structure.

Referring now to FIGURE 1, the table 6 is provided with a reciprocating first pusher element marked 7. This is mounted upon a carriage 8 slidable in ways on the table. The first pusher element is shown in the retracted position in FIGURE 1. If a stack of printed labels is placed on the table and the first pusher element is energized, it will move the stack to a position on the upper surface of the platform or anvil 4. The anvil is slotted as at 10 to receive the forwardmost end of the first pusher element, so as to permit the positioning of a stack of labels which is smaller than the area of the anvil; and the carriage 8 is adjustable with respect to a means for moving it, by the use of the nut 8a. As shown in FIGURES 1 and 10 a guide 9 may be provided to locate the side edge of the label stack as the stack is being pushed into position.

By the actuation of the first pusher element 7, the sheared stack of labels is pushed over the table and onto the surface of the anvil until it comes to rest against a first stop means (or front guide) which is not shown in FIGURE 1 for clarity, but is indicated in FIGURES 9 and 10 at 11a. It is mounted upon a sliding and adjustable base 11. The base can be moved by means of a threaded shaft engaging a portion of the base as shown and journaled in an upright 13 on the table 6. The shaft is fitted with a hand wheel or hand crank 14. The anvil 4 is slotted to receive the forward end of the first stop means as shown at 11b in FIGURE 10.

A guide means 15 is preferably provided to overlie the stacks of labels as they are being pushed toward the anvil. This element is old in the art, but is shown in FIGURES 1 and 9.

There is a second stop means or side guide 16a mounted on a base 16 which is slidable in ways 16b on the table. The second stop means itself has not been detailed for clarity in FIGURE 1; but is shown in FIGURES 9 and 10 as comprising a series of spaced plates to provide a broad bearing surface for the side of a stack of labels. The anvil is slotted as at 16c to receive these plates. The second stop means 16a is also adjustable as to position by a threaded shaft 17 operated by a hand wheel or crank 18. The element 9 as shown in FIGURES 1 and 10 may be attached to the second stop element 16 so as to be movable therewith, as most clearly shown in FIGURE 10.

Opposed to and spaced from the second stop means 16a there is a second pusher element 19, the nature of which will now be described in detail. The second pusher element 19 is mounted upon a body 20 (see FIGURES 1, 3, 4 and 12) which is slidable on a dovetailed bar 21. This bar is not affixed to the table, but instead is mounted to a plate 22, which lies above the table. In this instance, the threaded shaft 23, which is provided for adjustability is journalled in an upright 24, also mounted to the plate 22. It is threadedly engaged in the portion 25 of the body 20, and is provided with a crank or like means 26. A locking means 27 is provided to lock the body 20 in adjusted position on the plate 22. The plate 22 is slidably mounted on the table 6. Reference is particularly made to FIGS. 1, 3, 4, 10 and 12. The table 6 is provided with an aligned series of uprights 28 through 31, and with a second aligned series of uprights 28a through 31a spaced from the uprights 28 through 31. A shaft 32 has its ends mounted in the uprights 28 and 31. It is additionally supported by passing through coaxial perforations in uprights 29 and 30. A similar shaft 32a has its ends mounted in uprights 28a and 31a, and is additionally supported by passing through coaxial perforations in uprights 29a and 30a. The plate 22 is provided with side extensions 33 and 34, adapted to be between uprights 28 and 29, and uprights 30 and 31 respectively. Uprights 35 and 36 are mounted on the extensions 33 and 34. The shaft 32 passes through perforations in the uprights 35 and 36 in such a way that these uprights are slidable on the shaft. As will be noted in FIGS. 10 and 12, the plate 22 is provided on its opposite edge with similar extensions 33a and 34a. These extensions are provided with uprights 35a and 36a respectively, which slidably engage the shaft 32a.

From the above, it will be noted that the plate 22 is slidably mounted on the table 6 by virtue of the engagement of shaft 32 by uprights 35 and 36 and shaft 32a by uprights 35a and 36a.

Figure 3:
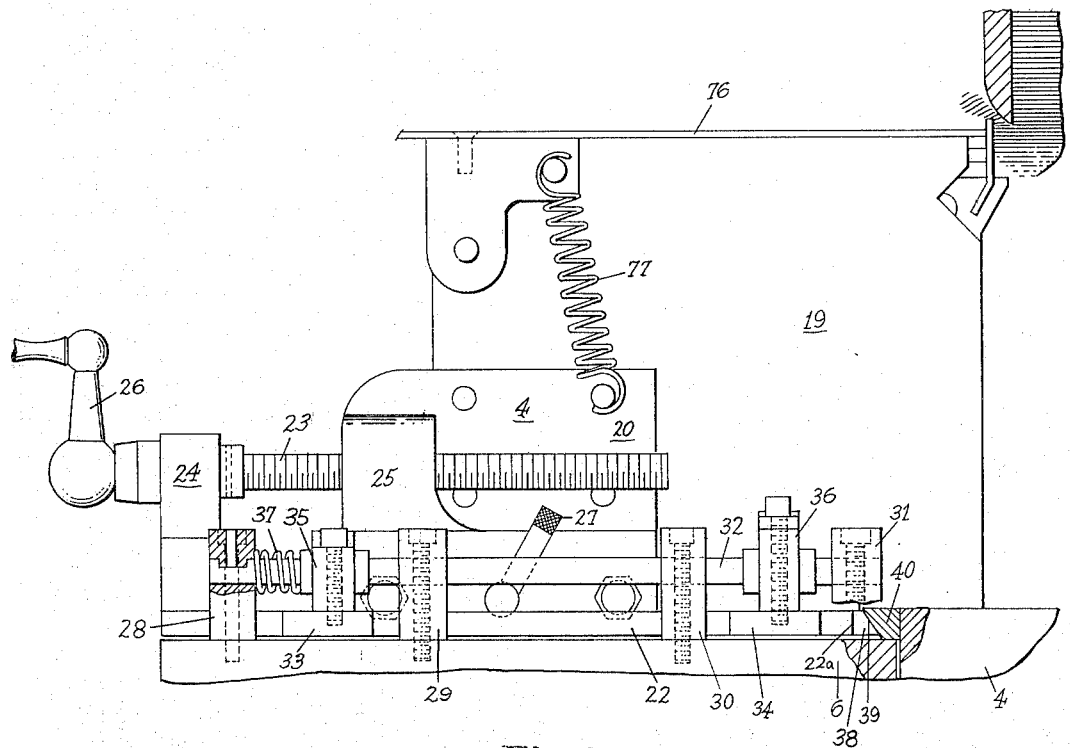
FIGURE 3 is a side elevational view with certain parts in section showing the second pusher element hereinafter described.

The plate 22 and the adjustable body 20 and the second pusher element 19 which it carries are urged to the right in FIG. 3 by coiled compression springs. One of these springs is shown at 37 mounted on the shaft 32 with its ends abutting upright 28 and upright 35 respectively. A similar spring 37a is supported on the shaft 32a with its ends abutting uprights 28a and 35a respectively. Adjustable stop means (not shown) limit the movement of the plate 22.

Figure 4:
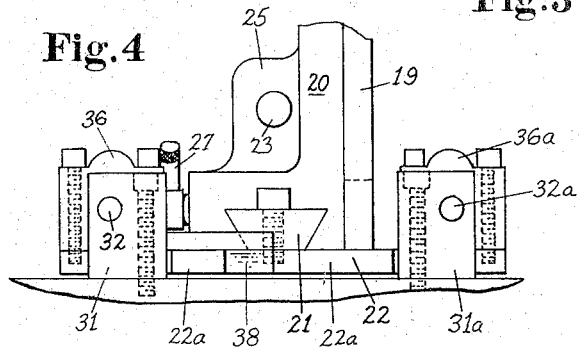
FIGURE 4 is a partial elevational view of the second pusher element and its supporting structure as seen from the right in FIGURE 3.

It will be seen in FIGS. 3 and 4 that the forward end 22a of the plate 20 has an extension 38 beveled as at 39.

The anvil 4 carries on its adjacent edge portion a correspondingly beveled cam member 40. When the anvil 4 is in its lowermost position, the cam member 40 acts against the beveled end of the extension 38 and holds the plate 22 in the position shown in FIG. 3 against the compression of the springs 37 and 37a.

When the anvil moves upwardly, however, the surface of the cam element 40 is removed from engagement with the beveled surface 39 and the plate 22 moves forwardly, the second pusher element 19 moving into a slot 19a in the anvil. When the second pusher element 19 is retracted, the first pusher element 7 can position a sheared stack of labels on the anvil against the first stop means 11a attached to the body 11. The stack of labels will then lie between the second stop means 16a (attached to the body 16) and the second pusher element 19. As soon as the anvil 4 starts its upward course of travel, the second pusher element 19 will move forwardly so as to push the stack of labels into positive aligning contact with the second stop means 16a. The stack of labels is thus positively positioned in two directions sequentially, which is a great improvement over anything hitherto known in the art.

Figure 8:
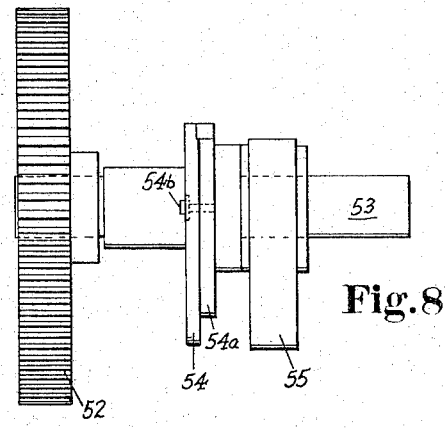
FIGURE 8 is an elevational view of a main shaft and its cam and gear wheel assembly.
Figure 5:
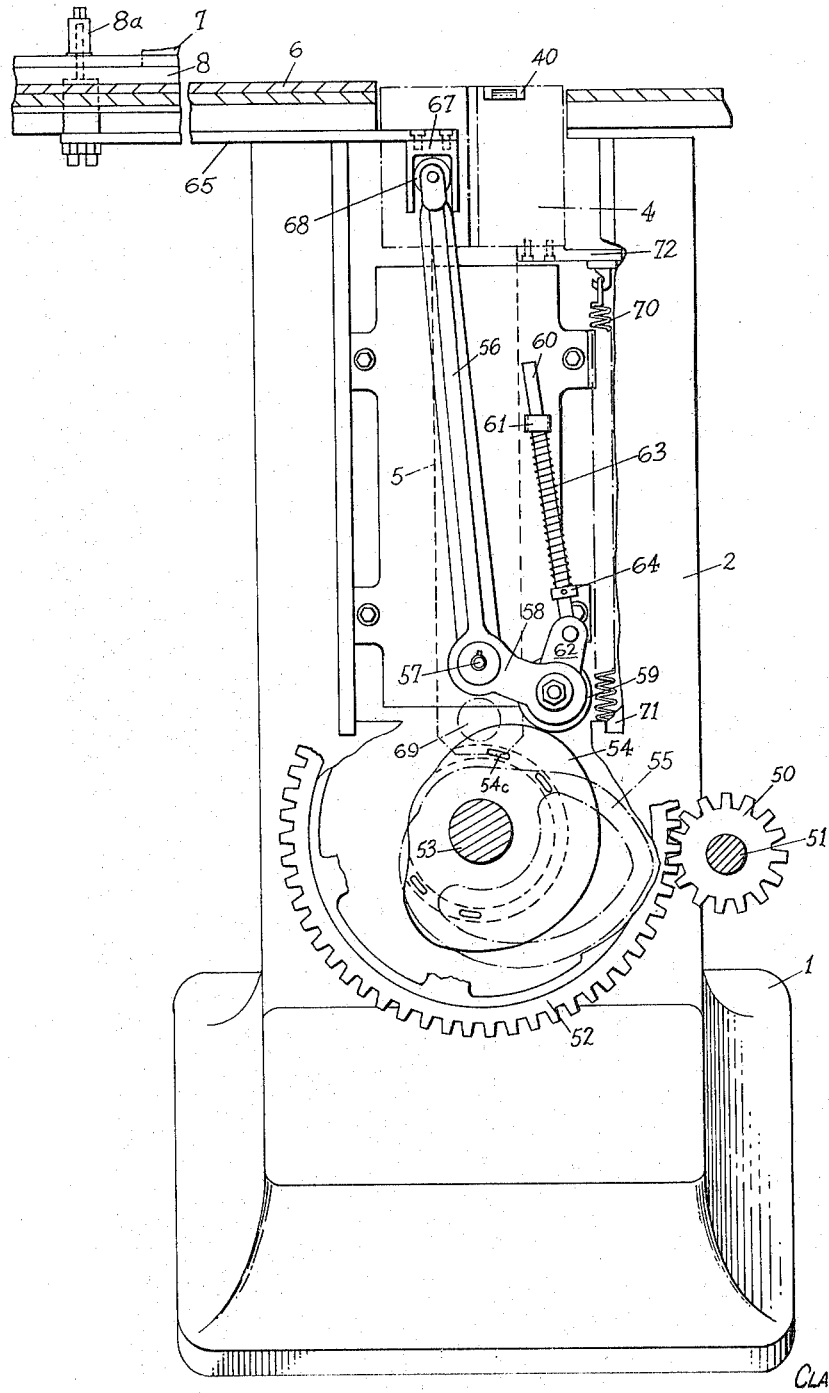
FIGURE 5 is an elevational view of the lower portion of the machine with certain elements broken away and showing the arm actuating a first pusher element in one position, the anvil being down.
Figure 6:
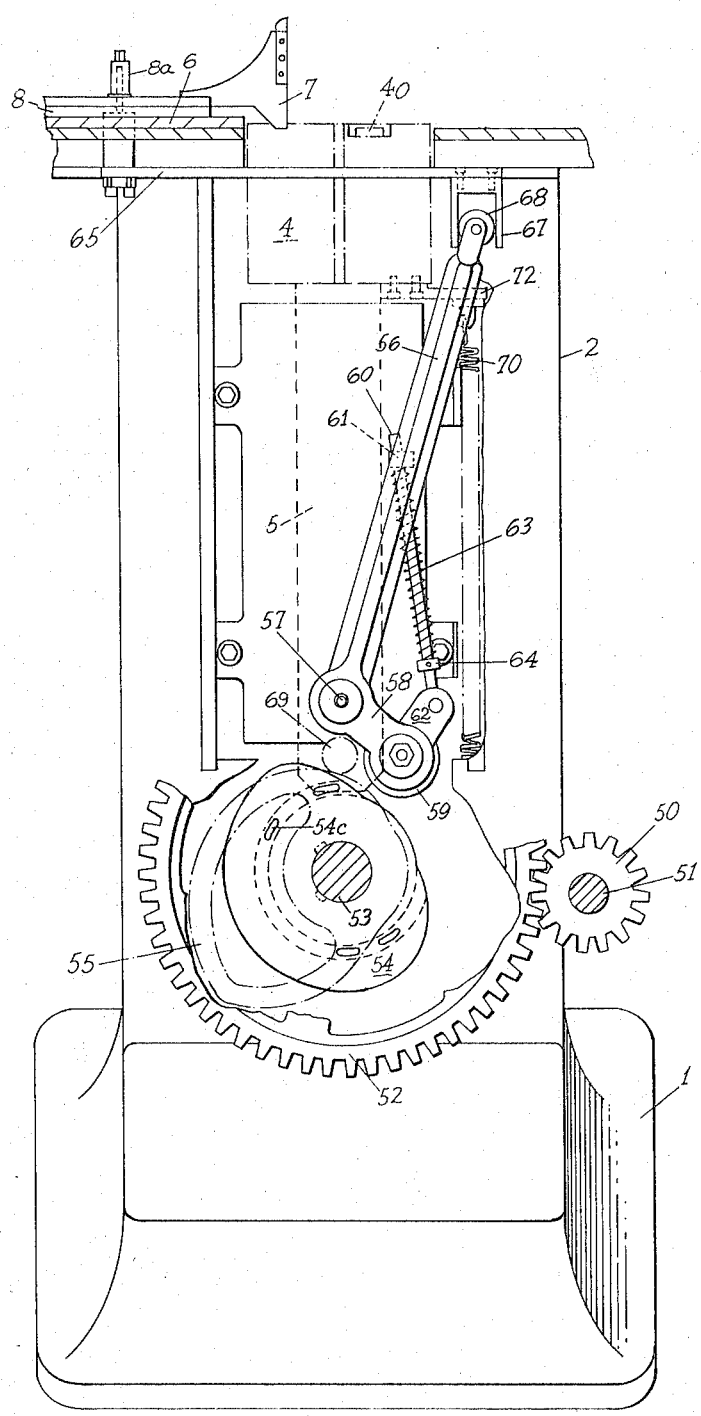
FIGURE 6 is a similar view showing the arm and the first pusher element in actuated condition, the anvil still being in the down position.
Figure 7:
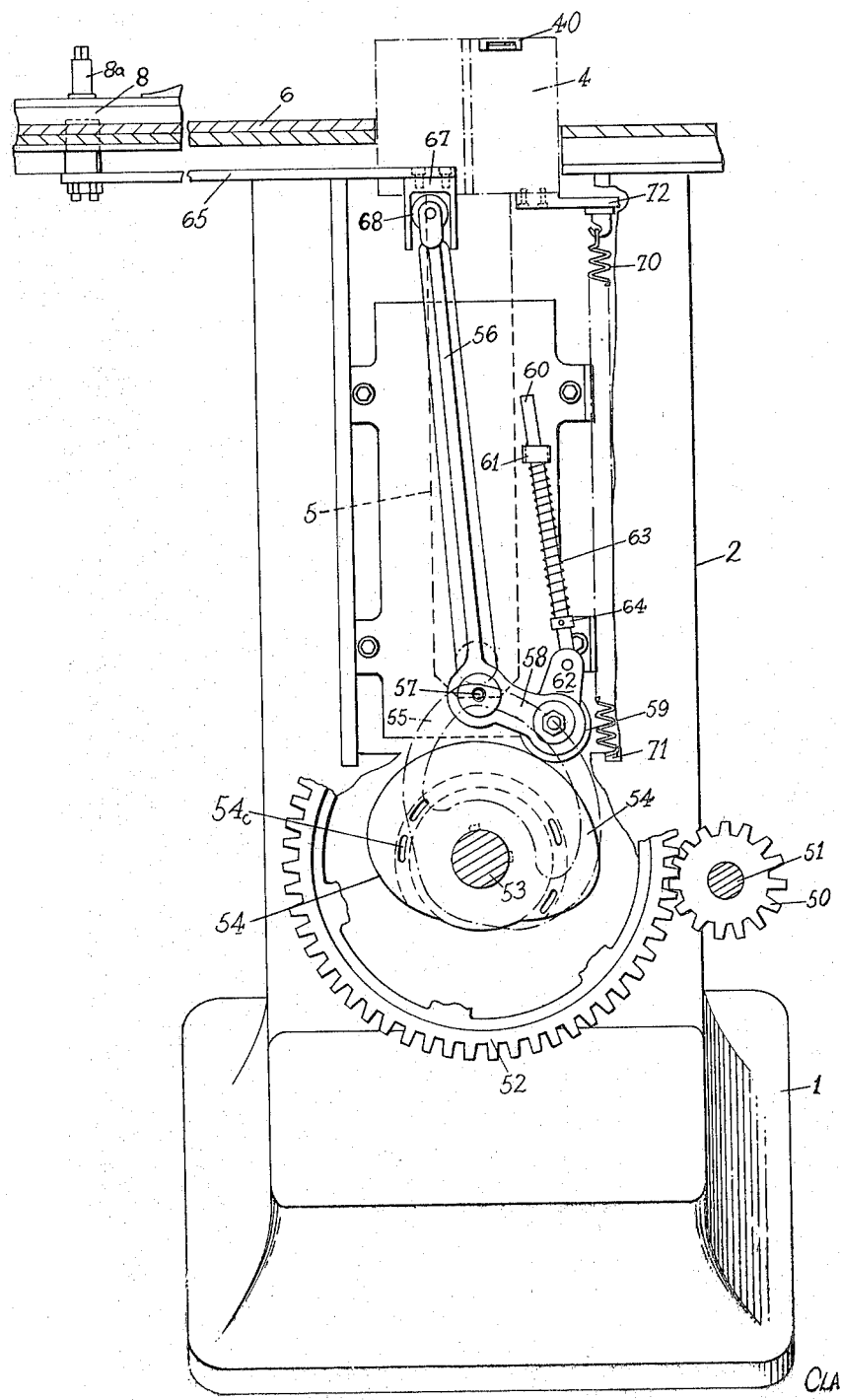
FIGURE 7 is a similar view showing the first pusher element in retracted position but with the anvil in the up position.

The die cutting machine of this invention is provided with a motor shown at 50a in FIGURES 2 and 10. A spur gear 50 on a shaft 51 is driven by the motor as indicated in FIGURES 5, 6 and 7. The spur gear 50 meshes with the teeth of a larger gear wheel 52, mounted upon a shaft 53 in the machine. This shaft carries two cam elements. The first is the cam 54, which operates an arm for moving the carriage 8 of the first pusher element 7. The second is a cam 55 of different shape, which operates the plunger 5. A side elevation of the gear 52, shaft 53, and cam elements is shown in FIGURE 8, where like parts are given like index numerals. It is preferred to make the cam 54 adjustable on the shaft 53. This may be accomplished by providing an element 54a (FIGURE 8) splined or otherwise rigidly mounted to the shaft 53. The cam element 54 can be attached in adjusted position to the element 54a by means of a series of bolts, one of which is shown at 54b. The bolts pass through slots in the cam member 54. Certain of these slots are shown at 54c in FIGURE 7.

An arm 56 is pivoted to the machine frame at 57 and has a lateral extension 58, carrying a cam roller 59 riding upon the surface of the cam 54. In order to keep the cam follower in contact with the surface of the cam, a rod 60 passes through an ear 61 on the machine frame. The bottom end of the rod is pivoted to an upwardly extending finger 62, on the extension 58. A compression spring 63 engages between the ear 61 and a collar 64 adjustable on the rod 60.

Figure 11:
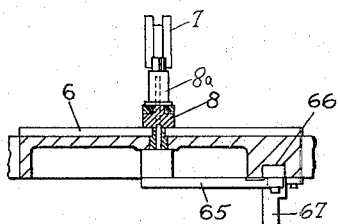
FIGURE 11 is a fragmentary cross-sectional view showing the interconnection between the first pusher element and the actuating arm.

In FIGURE 5, the arm 56 is shown in its left hand position. It is not in alignment with the ways in the table on which the carriage 8 slides. Hence, as shown in FIGURE 5 and also in FIGURE 11, the upper end of the arm 56 is connected to the carriage 8 by a laterally and rearwardly extending bracket 65. One portion of this bracket slides in a way 66 beneath the table top. The end of the bracket may be provided with a yoke 67, and the end of the rod 56 may carry a roller 68 to effect a slidable non-friction connection with the yoke 67. The carriage 8 is shown in its retracted position in FIGURE 5.

As previously indicated the anvil or platform 4 has a downwardly extending plunger 5, slidably mounted in the machine frame. The lower end of the plunger carries a cam follower roller 69, which is actuated by the cam 55 in certain rotary positions of its travel. Reference to FIGURE 6 will show the relationship of the parts when the arm 56 has traveled to its extreme right hand position, actuating the first pusher element 7 as above described. The anvil 4 has not yet started to rise; but the cam follower 69 has now come into contact with the cam 55. During the continued rotation of the gear wheel 52, the plunger 5 will cause the anvil 4 to rise. It has already been explained how the plate 22 and anvil 4 coact under these circumstances automatically to move the second pusher element 19 forwardly. The cam 54 is so configured as to cause the first pusher element 7 to remain in the position shown in FIG. 6 until the stack of labels on the anvil has been engaged by the die, whereupon the first pusher element 7 may be retracted.

A coiled tension spring 70 acting between a point 71 on the machine frame and a bracket 72 on the anvil serves to retract the plunger and anvil when released by the cam 55.

As shown in FIGURE 2, the cutting die is mounted on a head 73 connected by rods 74 to the table 6. After a stack of labels has been properly positioned upon the anvil, the anvil will be moved upwardly under power to cause the die to cut the labels. While this does not constitute a limitation on the invention, it may be pointed out that the range of movement of the anvil 4 is not great enough to bring the cutting surfaces of the die against the anvil. If this were done, the cutting edges of the die might be damaged. The cut portions of the stack of labels are held in the die because of the parallelism of the interior die surfaces. When the anvil descends, any uncut portion of the stack of labels is held immediately under the die by spring actuated triggers in the guide members 11a, 16a, 19 and 15. As shown in FIGURE 3, an element 76 may be pivoted to the top portion of the guide means 19 and controlled by a spring 77. Similar elements are attached to 15, 11a and 16a. These elements help to collect and discharge waste cut from the labels by gravity, as at 78 in FIGURE 2. By means of the triggers, an uncut portion of a stack of sheared label sheets will be retained in an upper position to permit the location of a succeeding stack on the anvil 4 after its descent.

Repeated operations of the machine result in a column of cut labels passing through the die and leaving the machine as shown at 75 in FIGURE 2. The cut labels may be carried away from the machine by any suitable means, forming no part of this invention.

The portions trimmed away from the stack of labels by the action of the die may be cut apart by exterior cutters forming part of the die. Because of the tilted position of the table 6, the scrap which has been cut apart into sections may be readily removed from the machine by gravity, as at 78 in FIGURE 2.

Modifications of the invention may be made without departing from the spirit thereof.

The embodiments of the invention in which an exclusive property or privilege is claimed are defined as follows:

1. In a machine of the character described, a table, a powered anvil means operating through the table, die means supported above the table for cutting stacks of labels located upon the said anvil, and means for locating the said stacks of labels thereon, the said means comprising a first pusher element operating in the direction of the length of the table and serving to push into position on the anvil a stack of labels for die cutting, a first adjustable stop means located opposite the said first pusher means and serving to stop a stack of labels at a selected position on the said anvil, a second adjustable stop means for positioning the stack of labels in a transverse direction, and a second movable pusher means operating in the direction of the said second stop means to locate said stack of labels in a transverse direction.

2. The structure claimed in claim 1 including means for retracting said first pusher element after said stack of labels is contacted by said die, leaving said stack of labels in engagement with said second pusher and said first and second stop means.

3. The structure claimed in claim 1, wherein said second movable pusher means comprises a member biased toward said second stop means, a cam surface in connection with said second movable pusher and a cooperating cam means on said anvil whereby when said anvil is in its lowermost position said second movable pusher means will be moved in a direction away from said second stop means.

4. The structure claimed in claim 3, wherein said second movable pusher means comprises a plate mounted on said table for movement toward and away from said second stop means, said second pusher means also comprising an element for contacting a stack of labels, said element being adjustably mounted with respect to said plate.

5. The structure claimed in claim 4, wherein certain upright elements are mounted on said plate, certain other upright elements are mounted on said table in alignment therewith, and including shafts mounted in the uprights on said table and passing through uprights on said plate, and biasing means for said plate consisting of coiled springs mounted on said shafts and engaging between an upright mounted on said table and an upright mounted on said plate.

6. The structure claimed in claim 5, wherein said plate has laterally projecting portions extending between the uprights mounted on said table, the uprights mounted on said plate being located on said projection.

7. The structure claimed in claim 6, wherein said element for contacting a stack of labels is mounted with respect to said plate on a dovetailed bar attached to said plate.

8. In a machine of the character described, a table, a powered anvil means operating through the table, die means supported above the table for cutting stacks of labels located upon said anvil, and means for locating the said stacks of labels thereon, the said means comprising a first pusher means operating in the direction of the length of the table and serving to push a stack of labels into a position on the anvil for die cutting, an adjustable first stop means located opposite the first pusher means, a second pusher means and an opposed second adjustable stop located transverse the direction of operation of the first pusher and first stop means, a source of power and cam means connected to said source of power for moving the first pusher means and for thereafter elevating said anvil, and means effective upon the movement of said anvil for releasing said second pusher means to cause it to approach said second stop means.

9. The structure claimed in claim 8, including means effective upon the continued rise of said anvil to retract said first pusher means.

10. In a machine of the character described, a table, a powered anvil means operating through the table, die means supported above the table for cutting a four-sided stack of labels located upon said anvil, and means for locating said stack of labels thereon, said means comprising a separate means positively engaging each side of said stack, at least one of said means being retractable after stack is engaged by said die.

No references cited.

WILLIAM W. DYER, Jr., *Primary Examiner.*

J. A. MEISTER, *Assistant Examiner.*

Disclaimer 3,290,977.—*Clarence C. Brestel*, Hamilton County, Ohio, and *Howard R. Maschinot*, Erlanger, Ky. DIE CUTTING MACHINES FOR LABELS AND THE LIKE. Patent dated Dec. 13, 1966. Disclaimer filed July 31, 1972, by the assignee, *The Printing Machinery Company*.

Hereby enters this disclaimer to claims 1 through 10 of said patent.

[*Official Gazette January 30, 1973.*]